United States Patent
Froehlich et al.

(10) Patent No.: US 9,528,627 B2
(45) Date of Patent: Dec. 27, 2016

(54) DRIVE HAVING AN EMERGENCY CLOSING FUNCTION

(75) Inventors: Udo Froehlich, Rothenfels (DE); Richard Tauber, Heigenbruecken (DE); Ibrahim Doertoluk, Haiback (DE)

(73) Assignee: Robert Bosch GmbH, Stuttgart (DE)

( * ) Notice: Subject to any disclaimer, the term of this patent is extended or adjusted under 35 U.S.C. 154(b) by 929 days.

(21) Appl. No.: 13/634,747

(22) PCT Filed: Feb. 15, 2011

(86) PCT No.: PCT/EP2011/000686
§ 371 (c)(1),
(2), (4) Date: Nov. 26, 2012

(87) PCT Pub. No.: WO2011/113510
PCT Pub. Date: Sep. 22, 2011

(65) Prior Publication Data
US 2013/0161145 A1    Jun. 27, 2013

(30) Foreign Application Priority Data
Mar. 15, 2010 (DE) .................... 10 2010 011 516

(51) Int. Cl.
*F16K 31/56* (2006.01)
*F16D 25/06* (2006.01)
(Continued)

(52) U.S. Cl.
CPC ............ *F16K 31/56* (2013.01); *F16D 25/06* (2013.01); *F16D 27/02* (2013.01); *F16K 31/1225* (2013.01)

(58) Field of Classification Search
CPC ...... F16K 31/56; F16K 31/1225; F16D 27/02; F16D 25/06
(Continued)

(56) References Cited

U.S. PATENT DOCUMENTS 3,022,425 A * 2/1962 Rockstead .......... F02D 19/0615
123/515
3,895,651 A * 7/1975 Okada .................... F16K 1/446
137/238
(Continued)

FOREIGN PATENT DOCUMENTS

DE   197 23 624 A1   2/1998
DE   101 52 414 A1   5/2003
(Continued)

OTHER PUBLICATIONS

International Search Report corresponding to PCT Application No. PCT/EP2011/000686, mailed Jul. 4, 2011 (German and English language document) (7 pages).

*Primary Examiner* — Eric Keasel
*Assistant Examiner* — Nicole Wentlandt
(74) *Attorney, Agent, or Firm* — Maginot, Moore & Beck LLP

(57) ABSTRACT

A drive having an emergency closing function comprises a movable coupling device, which has an emergency spring clamped between an input-side and an output-side spring system. The emergency spring is a compression spring moved along with the coupling device. A distance of the spring systems is defined by a locking device in normal operation of the drive, wherein the emergency spring can relax for an emergency function or emergency movement of the drive after the locking device is released or unlocked. The locking device is operated or triggered hydraulically or pneumatically and/or magnetically.

26 Claims, 11 Drawing Sheets

(51) Int. Cl.
*F16D 27/02* (2006.01)
*F16K 31/122* (2006.01)

(58) Field of Classification Search
USPC ............................................. 251/73, 69, 68
See application file for complete search history.

(56) References Cited

U.S. PATENT DOCUMENTS

| | | | | |
|---|---|---|---|---|
| 4,878,053 | A | * | 10/1989 | Rorden .................. E21B 34/06 |
| | | | | 166/66.4 |
| 5,080,392 | A | * | 1/1992 | Bazergui ................ B60G 15/00 |
| | | | | 188/266.4 |
| 2008/0179942 | A1 | * | 7/2008 | Lee ........................ B60T 8/368 |
| | | | | 303/20 |

FOREIGN PATENT DOCUMENTS

| | | |
|---|---|---|
| DE | 103 08 017 A1 | 11/2004 |
| GB | 2 057 639 A | 4/1981 |
| WO | 98/13633 A1 | 4/1998 |

* cited by examiner

DRIVE HAVING AN EMERGENCY CLOSING FUNCTION

This application is a 35 U.S.C. §371 National Stage Application of PCT/EP2011/000686, filed on Feb. 15, 2011, which claims the benefit of priority to Serial No. DE 10 2010 011 516.9, filed on Mar. 15, 2010 in Germany, the disclosures of which are incorporated herein by reference in their entirety.

BACKGROUND

The disclosure relates to a drive with emergency closing function.

For drives with an emergency closing function, various approaches are known.

Document DE 101 52 414 A1 and document DE 197 23 624 A1 present hydraulic drives for valve bodies of valves with fixed mechanical coupling between an actuating cylinder and the valve body. The valve body is biased in the closing direction of the respective valve by a respective emergency spring by which the valve is closed in the event of a fault.

A disadvantage of such hydraulic drives is that the emergency spring is relaxed or stressed during every adjustment movement of the valve body by the drive.

Document DE 103 08 017 B4 presents a hydraulic drive having a mechanical coupling and having an emergency spring, wherein in a normal operating mode, the emergency spring in the stressed state is moved jointly with the coupling. In an emergency operating mode, a knee lever device which holds the emergency spring stressed is released such that the emergency spring relaxes and thus spreads or lengthens the mechanical coupling. The valve is thereby closed.

A disadvantage of the latter drives is the outlay in terms of apparatus for the mechanical release function, which must be moved jointly with the emergency spring.

By contrast, it is the object of the disclosure to provide a drive which is simple in terms of apparatus and which has an emergency closing function.

Said object is achieved by a drive with emergency closing function.

SUMMARY

The drive according to the disclosure with emergency closing function has a coupling device which is movable—preferably in translatory fashion—and which has an emergency spring braced between a driving-side spring abutment and a driven-side spring abutment. The emergency spring is preferably a compression spring which is moved jointly with the coupling device. A spacing of the spring abutments is fixed in a normal operating mode of the drive by a locking device, wherein, after a release or unlocking of the locking device, the emergency spring is configured to relax for an emergency function or emergency movement of the drive. Here, according to the disclosure, the locking device is actuated or released hydraulically or pneumatically and/or magnetically. The outlay in terms of apparatus for the jointly moved parts of the locking device is thus reduced in relation to the prior art.

Further advantageous embodiments of the disclosure are described below.

In a preferred refinement, an adjustment drive is provided which enables generation of a translatory driving-side movement which is transmitted via the coupling device into a translatory driven-side movement of a valve body of a valve. After the release or unlocking of the locking device, it is alternatively possible for a translatory driven-side movement of the valve body in a closing direction of the valve to be generated by the emergency spring.

A preferred refinement has a positionally fixed cylinder and a driven-side piston accommodated therein, which cylinder and piston together delimit a driven-side annular chamber. Here, the driven-side piston is connected via a driven-side piston rod to the driven-side spring abutment. This permits the use of fixed feed lines to the positionally fixed cylinder and pump movements.

A damper which, during the emergency function or emergency movement, acts in the closing direction at the end of the driven-side movement protects against impacts of the driven-side piston and if appropriate of the valve after the release or unlocking of the locking device.

In a preferred exemplary embodiment, the damper is a fluidic end position damper. Here, said damper preferably has a damping chamber which is formed on the driven-side annular chamber and which is of reduced diameter in relation to the driven-side annular chamber, whereas the driven-side piston rod has a damping peg with an enlarged diameter in relation to the driven-side piston rod. When the damping peg protrudes into the damping chamber, the final part of the movement is damped.

In one refinement of the drive according to the disclosure, the cylinder has a driving-side piston which is connected via a corresponding driving-side piston rod to the driving-side spring abutment. Here, the driving-side piston rod extends through a corresponding driving-side annular chamber.

To permit a reversal of the closing direction, the adjustment drive and the driving-side piston are coupled via a connecting rod which extends through the driven-side spring abutment, the driven-side piston rod and the driven-side piston.

In one variant of the valve, the latter is a butterfly valve, wherein the valve body is a closing plate. The coupling device is then connected via a pivot drive to a shaft of the closing plate by which the closing plate and thus the valve are adjusted.

If the adjustment drive is arranged on a first side of the shaft or of the butterfly valve and the emergency spring is arranged on a second side, which is situated opposite the first side, of the shaft or of the butterfly valve, a space-saving refinement of the drive for the butterfly valve is created.

In a preferred refinement of the drive according to the disclosure, the two annular chambers are hydraulically coupled or connected via a coupling line. Here, the two pistons are arranged between the two annular chambers. In this way, the two pistons are held in contact with one another or pressed against one another, and thus the two spring abutments are held with a predetermined spacing to one another, by a common pressure of a pressure medium of the two associated annular chambers.

It is preferable for the coupling line or the driven-side annular chamber to be connectable or permanently connected via a low-pressure line to a low-pressure accumulator. During a movement of the pistons away from one another, in particular after the unlocking of the locking device, excess pressure medium flows out toward said low-pressure accumulator. This takes place, for example in the case of the hydraulic locking device, as a result of the undershooting of a predetermined pressure in the two annular chambers.

If an orifice is arranged in the low-pressure line and/or in the coupling line directly upstream of the driven-side 3/2 directional seat valve, it is furthermore possible for a speed of the movement in the closing direction of the driven-side piston after an unlocking of the locking device to be adjusted.

For the aeration of the chamber formed between the two pistons during the movement thereof away from one another, an aeration duct formed as a bore is preferable, which aeration duct extends through one of the two pistons and the associated piston rod, for example at the driving side.

A pressing force, generated by the common pressure of the two pressure chambers, between the two pistons is preferably greater than the sum of a force of the emergency spring and a force required to move the valve body. It is thus possible, in the normal operating mode, for the translatory movement of the adjusting drive to be reliably transmitted to the valve body without the two pistons moving away from one another.

In a preferred refinement of the drive according to the disclosure, there is arranged in the coupling line a driven-side 3/2 directional seat valve to which the low-pressure line is connected. The hydraulic securing device is released by said valve. It is thereupon possible, during a movement of the driven-side piston in the closing direction, for the excess pressure medium from the driven-side annular chamber to flow via the coupling line into the low-pressure accumulator. It is preferable if, in a spring-biased normal position of a valve body of the 3/2 directional seat valve, the driven-side annular chamber is connected to the low-pressure accumulator.

In a preferred refinement, the damping chamber is connected via a bypass line to a portion of the coupling line which connects the driven-side 3/2 directional seat valve and the driven-side annular chamber. Here, a check valve is arranged in a portion of the coupling line which is parallel to the bypass line, which check valve opens from the driven-side 3/2 directional seat valve toward the driven-side annular chamber. Damping, which is simple in terms of apparatus, for the final part of the emergency movement is thus realized, wherein the pressure medium of the driven-side annular chamber flows via the damping chamber and via the bypass line to the coupling line. Said pressure medium flow path is also utilized for a movement in the closing direction in the normal operating mode.

In a preferred variant of the drive, the adjustment drive is hydraulic or pneumatic and has a cylinder, in particular a synchronous cylinder, whose piston rod is moved by a piston of a machine which is operated as a pump. The driving-side spring abutment is fastened to the piston rod.

Here, if a pressure medium connection from the machine which can be operated as a pump to the cylinder can be shut off—in particular by means of a 4/2 directional valve—and if the machine is connected via a high-pressure line to the coupling line and via a suction line to the low-pressure accumulator, it is then possible to realize a pump function for increasing the pressing force between the driving-side piston and the driven-side piston.

To prevent cavitation, the suction line is connected via two branch lines, in which in each case one check valve is arranged, to the two working connections of the machine.

The low-pressure line and the coupling line are connected via a suction line in which there is arranged a check valve which opens from the low-pressure line toward the coupling line. It is thus possible, during a movement of the driving-side piston in the closing direction, for pressure medium to be sucked out of the low-pressure accumulator into the driving-side annular chamber.

In a preferred refinement of the drive according to the disclosure, there is arranged in the coupling line a driving-side 3/2 directional seat valve which is configured to connect the driving-side annular chamber via a high-pressure line to a high-pressure accumulator. In said refinement, the driving-side annular chamber is charged directly, and the driven-side annular chamber is charged indirectly via the coupling line, with high pressure. The two pistons are pressed together by said high pressure.

If the low-pressure line and the high-pressure line are connected by means of a suction line in which there is arranged a check valve which opens from the low-pressure line toward the high-pressure line, pressure medium can be sucked from the low-pressure accumulator to the high-pressure line.

Here, if at least one orifice is arranged in the high-pressure line between the high-pressure accumulator and a connection of the suction line, with a check valve which opens toward the high-pressure accumulator being arranged in a bypass line parallel to said at least one orifice, a pump function by the adjusting drive is possible. Here, pressure medium is pumped from the driving-side annular chamber via the check valve into the high-pressure accumulator, and subsequently pressure medium is sucked from the low-pressure accumulator into the driving-side annular chamber, wherein a return flow of pressure medium from the high-pressure accumulator via the at least one orifice is substantially prevented.

To prevent a return movement of the driven-side piston in the direction of the driving-side piston and thus in the opening direction of the valve body during the pump function, a portion of the coupling line arranged between the check valve and the driven-side 3/2 directional seat valve can be designed to be connectable alternately to the low-pressure line or to the high-pressure line via a 3/2 directional seat valve. Here, in a line which connects the portion of the coupling line to the 3/2 directional seat valve, there is arranged an orifice and a check valve which opens toward the 3/2 directional seat valve.

A preferred refinement of the drive according to the disclosure has a support or fastening element which is in the form of a hydraulic block and on or in which the one or more pressure accumulators, the valves and the ducts and the cylinders are arranged.

In a preferred variant or in a preferred refinement of the drive according to the disclosure, a magnetic locking device is provided as an alternative or in addition to the hydraulic locking device. Said magnetic locking device has an electromagnet which has a coil and an armature, the coil and armature being connected to in each case one of the two spring abutments. Said locking device is electrically actuated, wherein a deactivation or failure of an electrical current initiates an unlocking of the locking device and thus an emergency function or emergency movement.

The coil and the armature are arranged in each case annularly and are fastened in each case via a spacer part to the associated spring abutment, wherein the emergency spring is arranged in a protected manner in the interior of the two spacer parts.

If the magnetic locking device has a permanent magnet which provides for example 80% of the magnet force, the energy demand of the electromagnet during normal functioning is reduced.

The adjustment drive is preferably connected to the driving-side spring abutment. The adjustment drive is electric, for example in the form of an electric motor with spindle drive, hydraulic, for example with a hydraulic cylinder, or pneumatic, for example with a pneumatic cylinder.

A damping element is preferably arranged between the two pistons. Vibrations introduced by the valve body are thus prevented from being transmitted via the two pistons to the adjustment drive, in particular spindle drive.

BRIEF DESCRIPTION OF THE DRAWINGS

Various exemplary embodiments of the disclosure will be described in detail below on the basis of the figures, in which.

DETAILED DESCRIPTION

Figure 1:
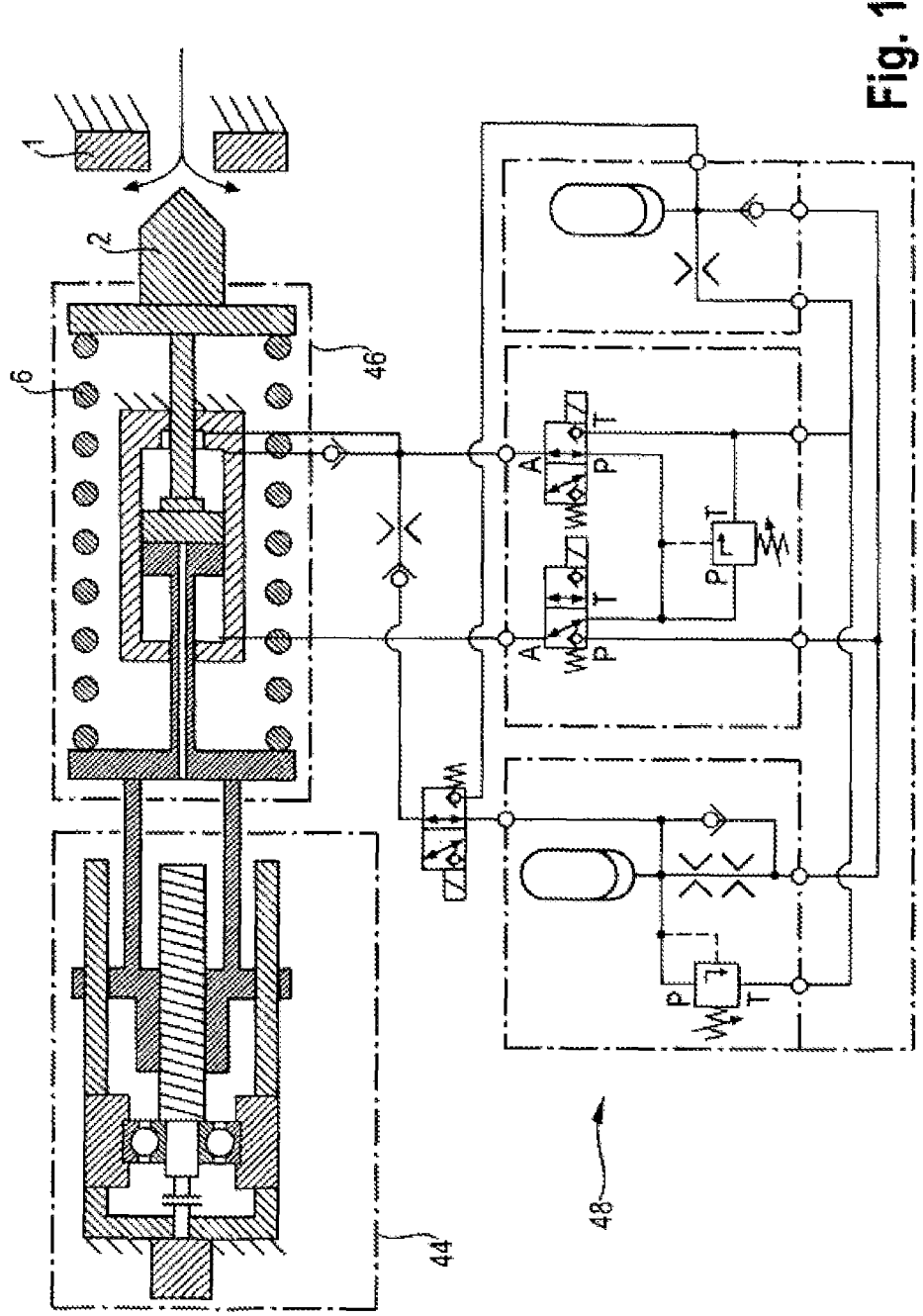
FIG. 1 shows, in a schematic illustration, a first exemplary embodiment of a drive according to the disclosure having an adjustment drive, having a hydraulic arrangement and having a coupling device with hydraulic locking device.

FIG. 1 shows a schematic illustration of a complete drive according to the disclosure as per a first exemplary embodiment. The drive has an adjustment drive 44 which is in the form of an electric cylinder and by which, in a normal operating mode of the drive, via a coupling device 46, a valve body 2 of a seat valve (in FIG. 1) is moved to the right in a closing direction or (in FIG. 1) to the left in an opening direction.

FIG. 1 shows the seat valve 1, 2 in an open position from which its valve body 2 can be pressed in the closing direction against the valve seat 1 of the seat valve.

Furthermore, the drive has a hydraulic arrangement 48 by which in particular a switch from a normal operating mode into an emergency operating mode of the drive according to the disclosure is performed. In the normal operating mode, the valve body 2 is moved by the adjustment drive 44, and in the emergency operating mode, the valve body 2 is moved instead by an emergency spring 6 integrated in the coupling device 46.

Figure 2:
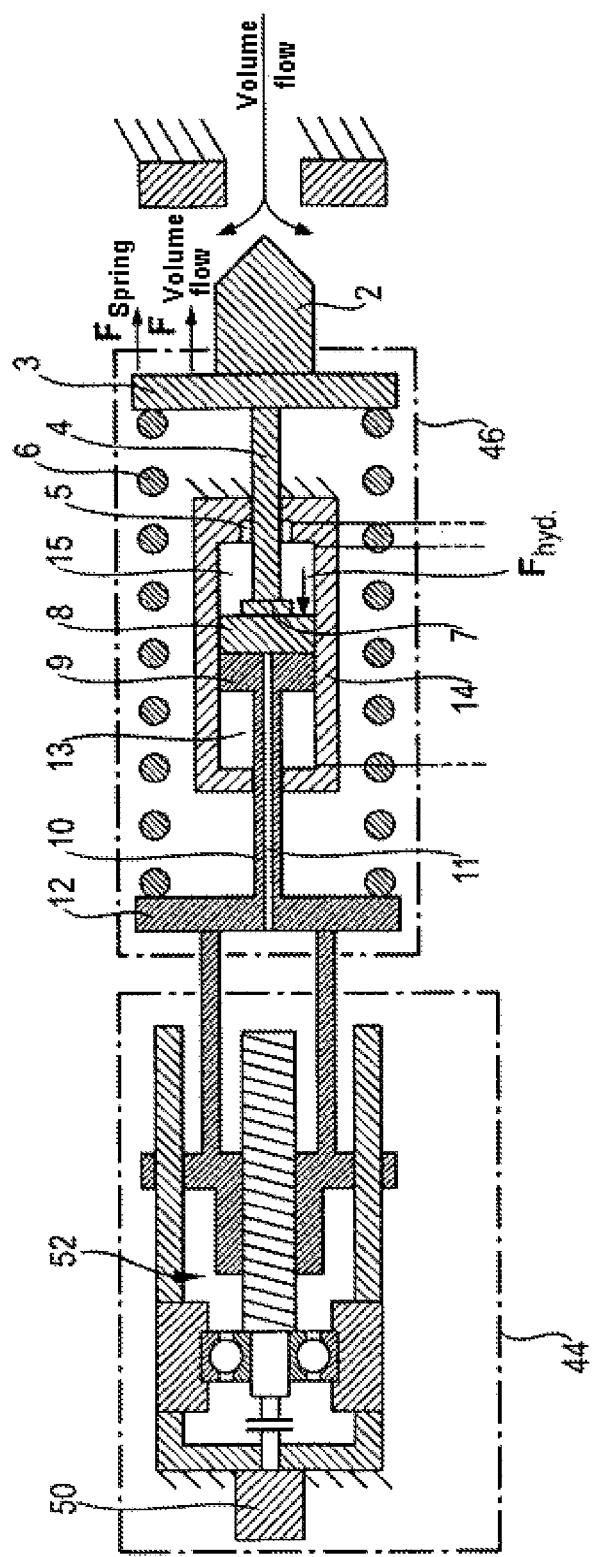
FIG. 2 shows the adjustment drive and the coupling device of the first exemplary embodiment as per FIG. 1.

FIG. 2 shows the adjustment drive 44 and the coupling device 46 of the first exemplary embodiment as per FIG. 1. The adjustment drive 44 has en electric motor 50 which, via a spindle drive 52, moves a driving-side spring abutment 12 in translatory fashion.

The coupling device 46 has a positionally fixed cylinder 14 which, during an adjustment of the valve body 2, is not jointly moved either in the normal operating mode or in the emergency operating mode. In said cylinder there are accommodated two pistons 8, 9 which bear against one another and which have in each case one piston rod 4, 10. At the driving side, the piston rod 10 connects the piston 9 to the spring abutment 12, whereas at the driven side, the piston rod connects the piston 8 to a spring abutment 3. The emergency spring 6 is braced between the two spring abutments 3, 12.

The pressure in the annular chambers 13, 15 presses the pistons 8, 9 against one another with a force greater than the sum of a spring preload force of the emergency spring 6 and the greatest operating force exerted on the valve body 2 by the volume flow. It is thereby ensured that the two pistons 8, 9 bear against one another at all times and the force of the adjustment drive 44 acts on the valve body 2. The force of the adjustment drive 44 acts on the driving-side spring abutment 12 and thus moves the spring 6, the two piston rods 4, 10, the two pistons 8, 9 and finally the valve body 2. In this way, the spacing between the valve body 2 and valve seat 1 in the normal operating mode is set, and the volume flow thus regulated. Here, the volumes of the two annular chambers 13, 15 vary.

In the drive according to the disclosure, in the normal operating mode, an emergency spring 6 is held braced between spring abutments 3, 12 by the pressure in the annular chambers 13, 15. In the emergency operating mode, the driven-side annular chamber 15 is opened. The emergency spring 6 then moves the valve body 2 toward the valve seat 1 and thus closes the seat valve 1, 2. In particular, in the emergency operating mode, the relaxing emergency spring 6, the driven-side spring abutment 3 and the valve body 2 move, wherein the spring abutment 3 drives the driven-side piston 8 via the driven-side piston rod 4. The movement of said parts in the closing direction continues until the valve body 2 sets down on the valve seat 1 and thus shuts off the volume flow.

Figure 3:
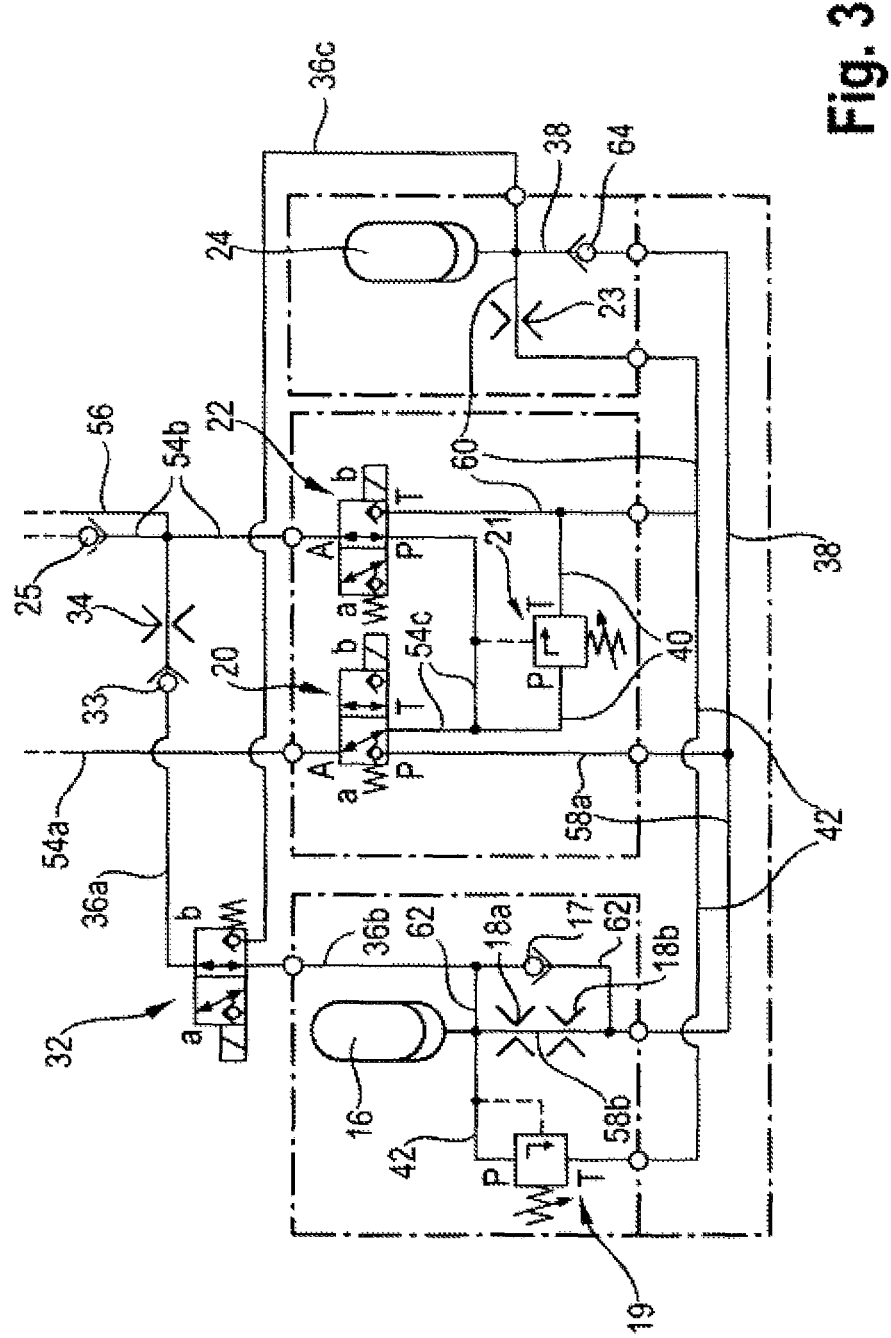
FIG. 3 shows the hydraulic arrangement of the first exemplary embodiment as per FIG. 1.

FIG. 3 shows the hydraulic arrangement 48 of the first exemplary embodiment as per FIG. 1. Said hydraulic arrangement has a coupling line for connecting the two annular chambers 13, 15 (cf. FIG. 2), said coupling line being composed of a driving-side portion 54a, a driven-side portion 54b and a central portion 54c. In the driven-side portion 54b there is arranged a check valve 25 which opens in the direction of the driven-side annular chamber 15, wherein parallel to said check valve there is provided a bypass line 56 which connects a damping chamber 5 of the driven-side annular chamber 15 (cf. FIG. 2) to the driven-side portion 54b.

Between the driving-side portion 54a and the central portion 54c of the coupling line there is provided a driving-side 3/2 directional seat valve 20, whereas a corresponding driven-side 3/2 directional seat valve 22 is provided between the driven-side portion 54b and the central portion 54c. The driving-side 3/2 directional seat valve 20 connects the two portions 54a, 54c of the coupling line when in a spring-biased normal position a, whereas said valve connects the driving-side portion 54a to a high-pressure accumulator 16 via a high-pressure line 58a, 58b when in an energized switching position b. The driven-side 3/2 directional seat valve 22 connects the two portions of the coupling line 54b, 54c when in a switching position b, whereas said valve connects the driven-side portion 54b of the coupling line to a tank or low-pressure accumulator 24 via a low-pressure line 60 when in a spring-biased normal position a.

Two orifices 18a, 18b are arranged in a portion 58b of the high-pressure line, wherein parallel to the orifices 18a, 18b there is arranged a bypass line 62 with a check valve 17 which opens toward the high-pressure accumulator.

An orifice 23 is provided in the low-pressure line 60.

The central portion 54c of the coupling line is connected via a relief line 40 to the low-pressure line 60, wherein in the relief line 40 there is provided a pressure-limiting valve 21. Between the portion 58b of the high-pressure line and the low-pressure line 60 there is provided a relief line 42 in which a pressure-limiting valve 19 is arranged.

Between the low-pressure line 60 and the portion 58a of the high-pressure line there is provided a suction line 38 in which there is arranged a check valve 64 which opens from the low-pressure line 60 toward the high-pressure line 58a.

The driven-side portion 54b of the coupling line is connected via a line 36a to a 3/2 directional seat valve 32 which connects the line 36a via a line 36b to the bypass line 62 when in a spring-biased normal position b, while connecting the line 36a via a line 36c to the low-pressure line 60 when in a switching position a.

An increase in the hydraulic preload will be explained below with reference to FIG. 3: if the pressure in the annular chambers 13, 15 falls, as a result of leakage or temperature influence, to such an extent that a risk is posed to the above-described pressing-together of the pistons 8, 9, the pressure in the annular chambers 13, 15 must be increased. For this purpose, the 3/2 directional seat valve 20 is switched into its switching position b. As a result, the annular chamber 13 is charged with the pressure of the high-pressure accumulator 16 and raised to the pressure level of the latter. If the 3/2 directional seat valve 20 is switched back into the normal position a and the two annular chambers 13, 15 are connected, then an average pressure of the pressures thereof is generated in the two annular chambers 13, 15. If said average pressure is insufficient, the 3/2 directional seat valve 20 is switched back and forth until the average pressure is high enough.

A pressurization of the high-pressure accumulator 16 will be explained below: if the hydraulic pressure in the high-pressure accumulator 16 falls, as a result of leakage or temperature influence, to a value which no longer permits the above-described increase in the hydraulic preload, the pressure in the high-pressure accumulator 16 must be increased. For this purpose, the 3/2 directional seat valve 20 is switched into the switching position b, and thus the high-pressure accumulator 16 is connected to the driving-side annular chamber 13. The piston 9 is then moved by the force of the adjustment drive 44 such that the annular chamber is decreased in size. As a result, the piston 9 pumps pressure medium from the annular chamber 13 into the high-pressure accumulator 16, and thus increases the pressure of the latter.

During said movement, air simultaneously flows through the bore or the aeration duct 11 into the space formed between the pistons 8, 9. The pressure falls in the annular chamber 15 because, since the piston 9 is no longer exerting a force on the piston 8, the pressure in the annular chamber 15 is then a function of the spring preload force of the emergency spring 6 and the operating force exerted on the valve body 2 by the volume flow. The spring force is always greater than the operating force.

The piston 9 is subsequently moved quickly back into its initial position (to the right in FIG. 2) by the force of the adjustment drive, and the annular chamber is thus increased in size again. During said process, a large amount of pressure medium flows from the low-pressure accumulator 24 via the suction line 38 into the annular chamber 13. Pressure medium simultaneously also flows into said annular chamber 13 from the high-pressure accumulator 16. The latter amount is however small, because the flow thereof is hindered by the two orifices 18a, 18b, such that the pressure level in the high-pressure accumulator 16 scarcely falls. Directly thereafter, the pressure of the high-pressure accumulator 16 propagates in the annular chamber 13. The pumping process can then be repeated. When the pressure level is high enough, a return to the normal operating mode is effected by switching of the 3/2 directional seat valve 20 into the switching position a.

If the pumping movement is to take place during the normal operating mode, the piston 9 is moved away from the piston 8. As a result, the pressure in the driven-side annular chamber 15 falls to a value determined by the force of the emergency spring 6 and the force of the volume flow. The starting pressure in the annular chambers 13, 15 is at least as high as the pressure resulting from the highest volume flow force, plus that resulting from the highest spring force, plus a safety margin. This ensures that the two pistons 8, 9 remain pressed against one another even under the action of the highest volume flow force. The lowered pressure in the driven-side annular chamber 15 is associated with an increase in size of the pressure medium volume in the annular chamber 15, and results in the piston 8 being displaced in the opening direction. The pressure medium in the annular chamber 15 acts as a spring.

To prevent said movement in the opening direction, the lines 36a to 36c, the valves 32, 33 and the orifice 34 are provided.

The 3/2 directional seat valve 32, when in its switching position b, has no influence on the functions presented in the description because the high-pressure accumulator 16 is separated by the check valve 33. The pressure is always higher in the high-pressure accumulator 16 than in the rest of the hydraulic system, and the check valve 33 thus remains closed. The low-pressure accumulator 24 is separated by the closing function b of the 3/2 directional seat valve 32.

In order that the above-described displacement of the piston 8 does not take place during the pumping function, the pressure in the annular chamber 15 is decreased to such an extent that its force action $F_{hyd}$ on the piston 8 cancels out the other forces.

$$F_{spring} + F_{volume\ flow} = F_{hyd}.$$

Only then is the pumping process commenced. The position of the piston 8 then does not change.

For this purpose, the piston 9 is held in its position by the electric motor 50 and the 3/2 directional seat valve 32 is switched into its switching position a. Since pressure medium flows from the annular chamber 15 via orifice 34, check valve 33 and 3/2 directional seat valve 32 to the low-pressure accumulator 24, the pressure in the annular chamber 15 falls. This is continued until the predetermined pressure prevails in the annular chamber 15. The magnitude of said predetermined pressure is predefined by the known spring force $F_{spring}$ and the force resulting from the action of the volume flow $F_{volume\ flow}$. The force $F_{volume\ flow}$ is proportional to the torque at the electric motor 50, and can be determined therefrom.

The 3/2 directional seat valve 32 is then switched back into its switching position b, and the pumping process can begin without the piston 8 moving.

During a part stroke test, the emergency functionality of the drive is checked during operation and substantially without impairment to said operation. Here, it is determined whether the emergency spring 6 can move the piston 8 in the closing direction. So as not to impair the operation, said movement should be only small.

For this purpose, the above-described pressure reduction by the 3/2 directional seat valve 32 beyond the predetermined pressure is continued, the spring force/volume flow force thus prevails, and the piston 8 is moved slowly, owing to the orifice 34, in the closing direction. The process is ended by the valve 32 being placed back into its switching position b. The starting position of the piston 8 and the outlet pressure in the annular chambers 13, 15 is attained by switching of the 3/2 directional seat valve 20 back and forth. Here, the pressure in the high-pressure accumulator 16 is distributed to the annular chambers 13, 15.

Figure 4:
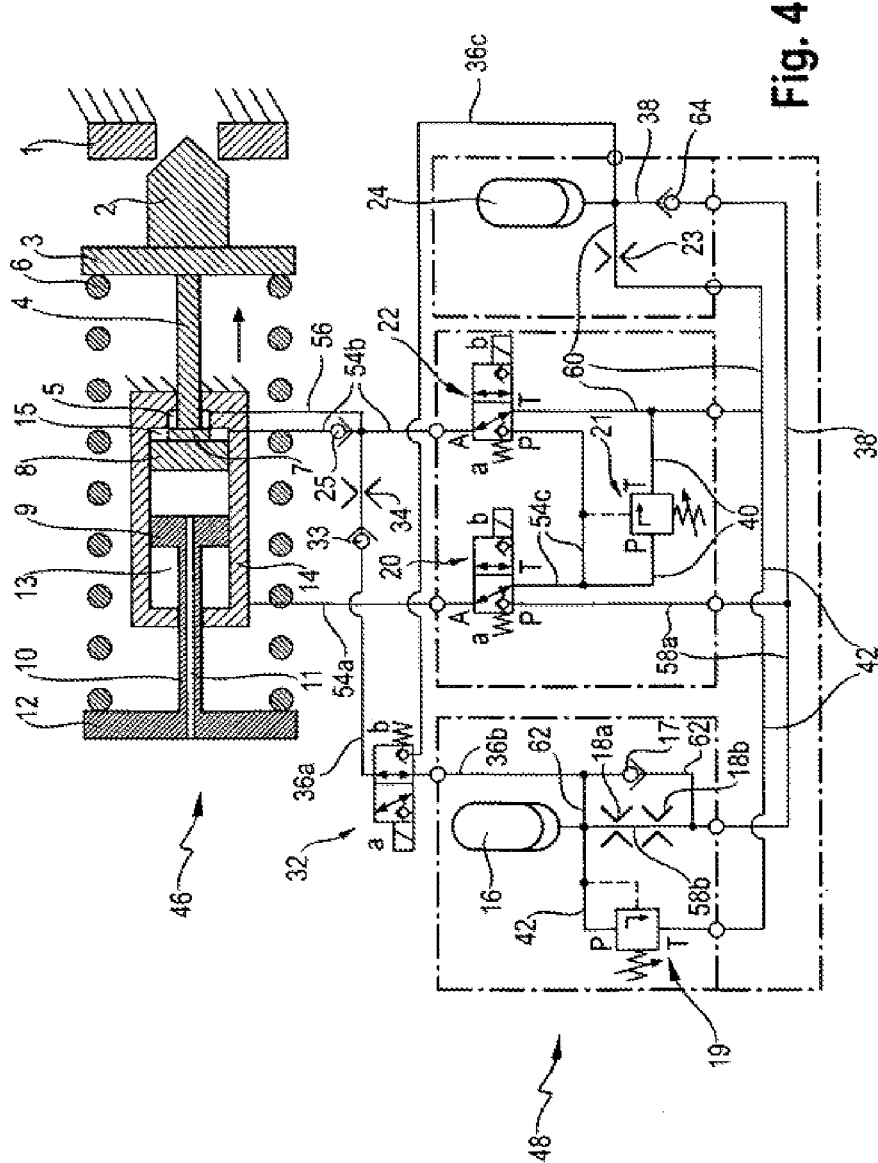
FIG. 4 shows the coupling device and the hydraulic arrangement of the first exemplary embodiment of the drive according to the disclosure in the emergency function.

FIG. 4 shows the coupling device 46 and the hydraulic arrangement 48 of the first exemplary embodiment of the drive according to the disclosure in the emergency function. Said emergency function is triggered by switching of the driven-side 3/2 directional seat valve 22 into its spring-biased switching position a. The driven-side annular chamber 15 is thus connected to the low-pressure accumulator 24. Here, the driving-side annular chamber 13 remains shut off. The driven-side piston 8 is driven by the emergency spring 6 and forces pressure medium from the annular chamber 15 via the orifice 23 into the low-pressure accumulator 24, and moves the valve body 2 in the closing direction. The speed of the piston 8 is limited by the orifice 23. During said emergency movement, the emergency spring 6 is supported via the driving-side spring abutment 12, the driving-side piston rod 10 and the driving-side piston 9 on the pressure in the driving-side annular chamber 13 which is shut off.

When the damping peg 7 protrudes into the annular chamber 5 provided for it, the outflow of the pressure medium from the annular chamber 15 is throttled. As a result, a pressure is generated in the annular chamber 15 which slows the movement of the piston 8. This state or moment is shown in FIG. 4.

A restoration of operational readiness will be explained below: proceeding from a closed position of the seat valve 1, 2, the driving-side 3/2 directional seat valve 20 is switched into the switching position b, and the piston 9 is thereupon pressed against the piston 8 by a fast movement of the adjustment drive 44. As a result of the fast movement, pressure medium flows from the low-pressure accumulator 24 and from the high-pressure accumulator 16 into the annular chamber 13. Here, the larger amount comes from the low-pressure accumulator 24, because the amount flowing in from the high-pressure accumulator 16 is throttled by the two orifices 18a, 18b. Directly thereafter, the pressure of the high-pressure accumulator 16 propagates in the driving-side annular chamber 13.

The driven-side 3/2 directional seat valve 22 is switched into the switching position b, whereas the driving-side 3/2 directional seat valve 20 is switched back and forth between its switching positions until the pressure of the high-pressure accumulator 16 has propagated in both annular chambers 13, 15. The driving-side 3/2 directional seat valve 20 thereafter remains in the switching position a, and operational readiness for the normal function and the emergency function is restored.

Since the pressure medium volume is closed and expands to a greater extent than the surrounding metal in the event of a temperature increase, pressure is generated. The magnitude of the pressure is limited by the pressure-limiting valve 21 which, when its set pressure is reached, connects the annular chambers 13, 15 to the low-pressure accumulator 24.

Figure 5:
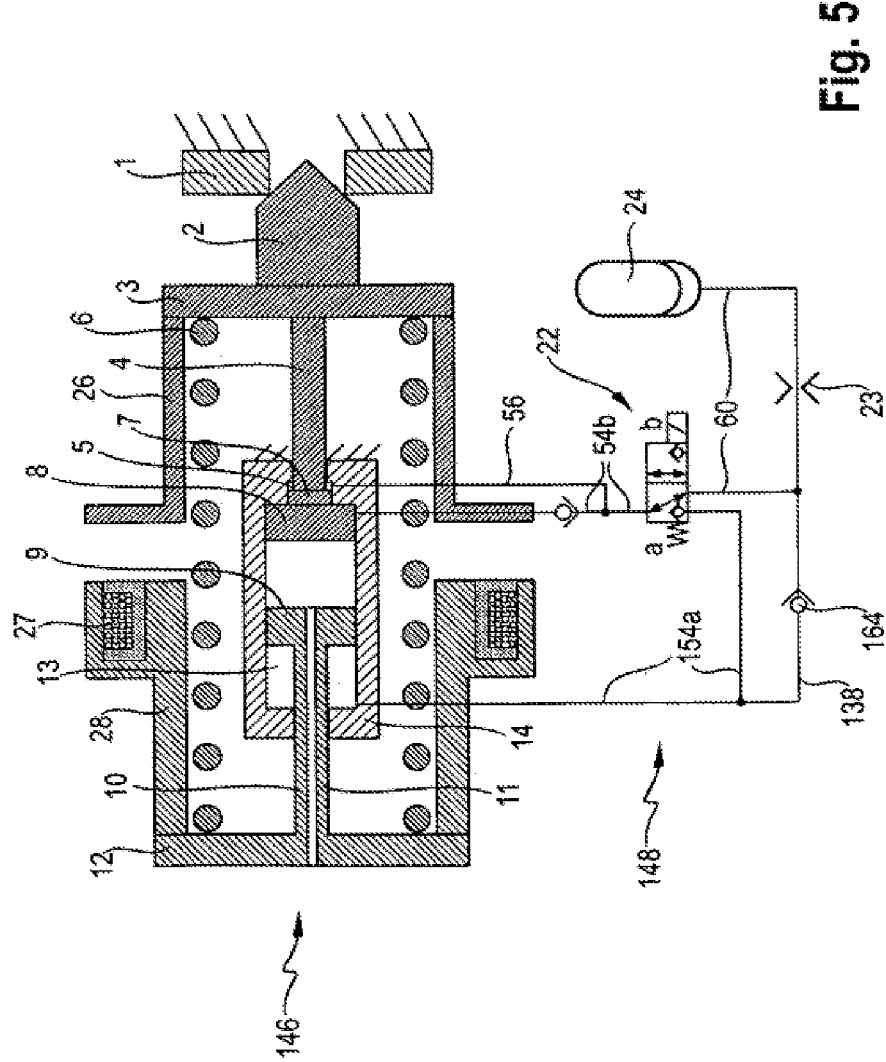
FIG. 5 shows, in a schematic illustration, a coupling device with a hydraulic and magnetic locking device and a hydraulic arrangement of a second exemplary embodiment of the drive according to the disclosure.

FIG. 5 shows a coupling device 146 with a hydraulic and magnetic locking device and a hydraulic arrangement 148 of a second exemplary embodiment of the drive according to the disclosure. In relation to the coupling device 46, the coupling device 146 is supplemented by two spacer parts 26, 28 which are connected by an electromagnet. The electromagnet has a coil 27. The spacer part 28 is fastened to the spring abutment 12 and the spacer part 26 is fastened to the spring abutment 3. When the emergency spring 6 is braced by the force of the adjustment drive 44 and the two spacer parts 26, 28 are in contact, the coil 27 of the electromagnet is energized. The resulting magnetic force is greater than the spring preload force of the emergency spring 6 and presses the spacer parts 26, 28 against one another. The emergency spring 6 remains braced by the magnet force. Both locking devices—magnetic and hydraulic—act in parallel and redundantly.

The hydraulic arrangement 148 has a coupling line 154a, 54b to the driven-side 3/2 directional seat valve 22, to which the low-pressure accumulator 24 is connected via the low-pressure line 60. The low-pressure line 60 is connected via a suction line 138 to the driving-side portion 154a of the coupling line. In the suction line there is arranged a check valve 164 which opens toward the coupling line 154a.

The emergency function is triggered by the non-energization of the electromagnet 27 and of the 3/2 directional seat valve 22, as a result of which the former loses its force action and the latter is switched into the switching position a. The subsequent closing movement of the piston is limited in terms of its speed by the orifice 23 and is slowed by the end position damping 5 and 7. The driving-side piston 9 maintains its position during the emergency movement. In the driving-side annular chamber 13, pressure builds up in accordance with the spring force of the emergency spring 6.

Figure 6:
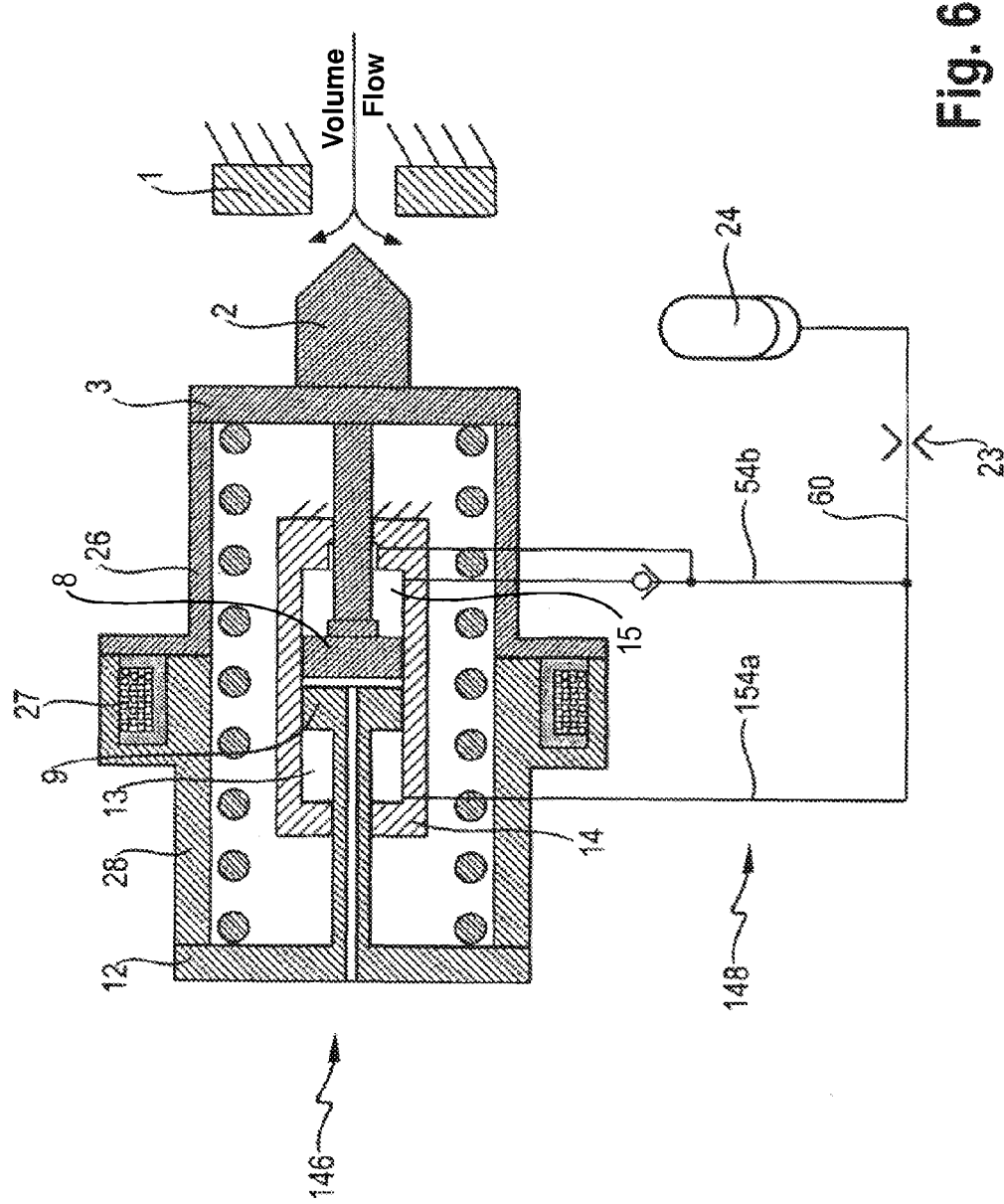
FIG. 6 shows, in a schematic illustration, a coupling device with a magnetic locking device and a hydraulic arrangement of a third exemplary embodiment of the drive according to the disclosure.

FIG. 6 shows the coupling device 146 as per FIG. 5, with only a magnetic locking device, and a hydraulic arrangement of a third exemplary embodiment of the drive according to the disclosure. Both annular chambers 13, 15 are charged with pressure from the low-pressure accumulator 24.

After the triggering of the emergency function by the switching of the coil 27 into the deenergized state, both pistons 8, 9 seek to move away from each other. The end position is reached when the piston 9 makes contact with the housing of the positionally fixed cylinder 14, and the valve body 2 makes contact with the valve seat 1.

Figure 7:
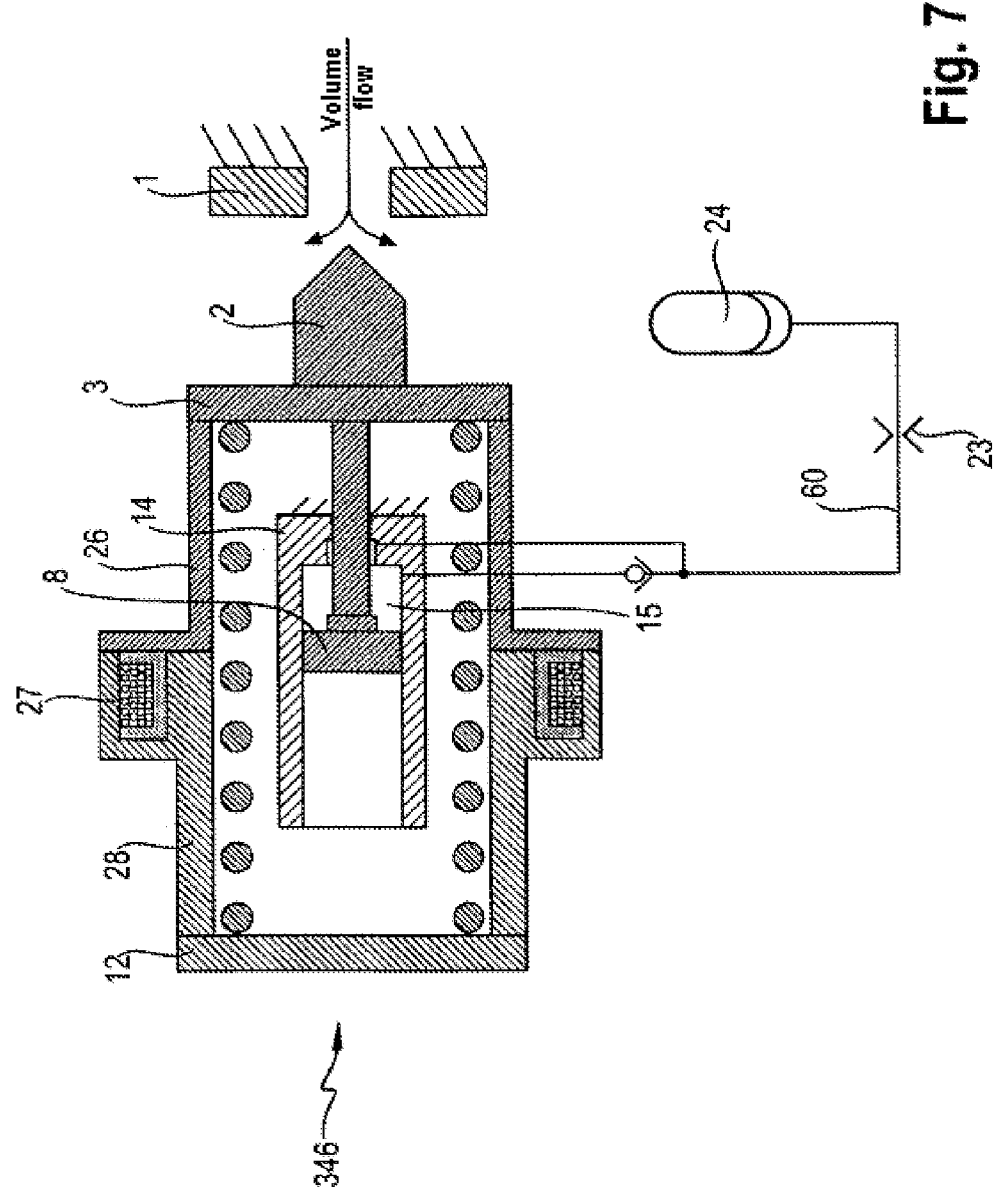
FIG. 7 shows, in a schematic illustration, a coupling device with a magnetic locking device and a hydraulic arrangement of a fourth exemplary embodiment of the drive according to the disclosure.

FIG. 7 shows a coupling device 346, with only a magnetic locking device, and a hydraulic arrangement of a fourth simple exemplary embodiment of the drive according to the disclosure. In said exemplary embodiment, the driving-side piston with the driving-side piston rod and the coupling line are dispensed with.

By contrast to the second exemplary embodiment as per FIG. 5, the hydraulic arrangement 138 shown therein may also be replaced by the hydraulic arrangement 38 of the first exemplary embodiment shown in FIG. 3.

FIGS. 8a to 8d show a fifth exemplary embodiment of a drive according to the disclosure, the adjustment drive 444 of which is a hydraulic or pneumatic direct drive (instead of an electromechanical spindle drive 52). The coupling device 46 and a hydraulic arrangement 448 with a hydraulic locking device are also shown.

The adjustment drive 444 is composed of an electric motor 450, a coupling 66, a machine 68 which can be operated as a pump and as a motor, three check valves 70, 71, 72, a 4/2 directional valve 74, and a hydraulic/pneumatic cylinder 76.

Figure 8A:
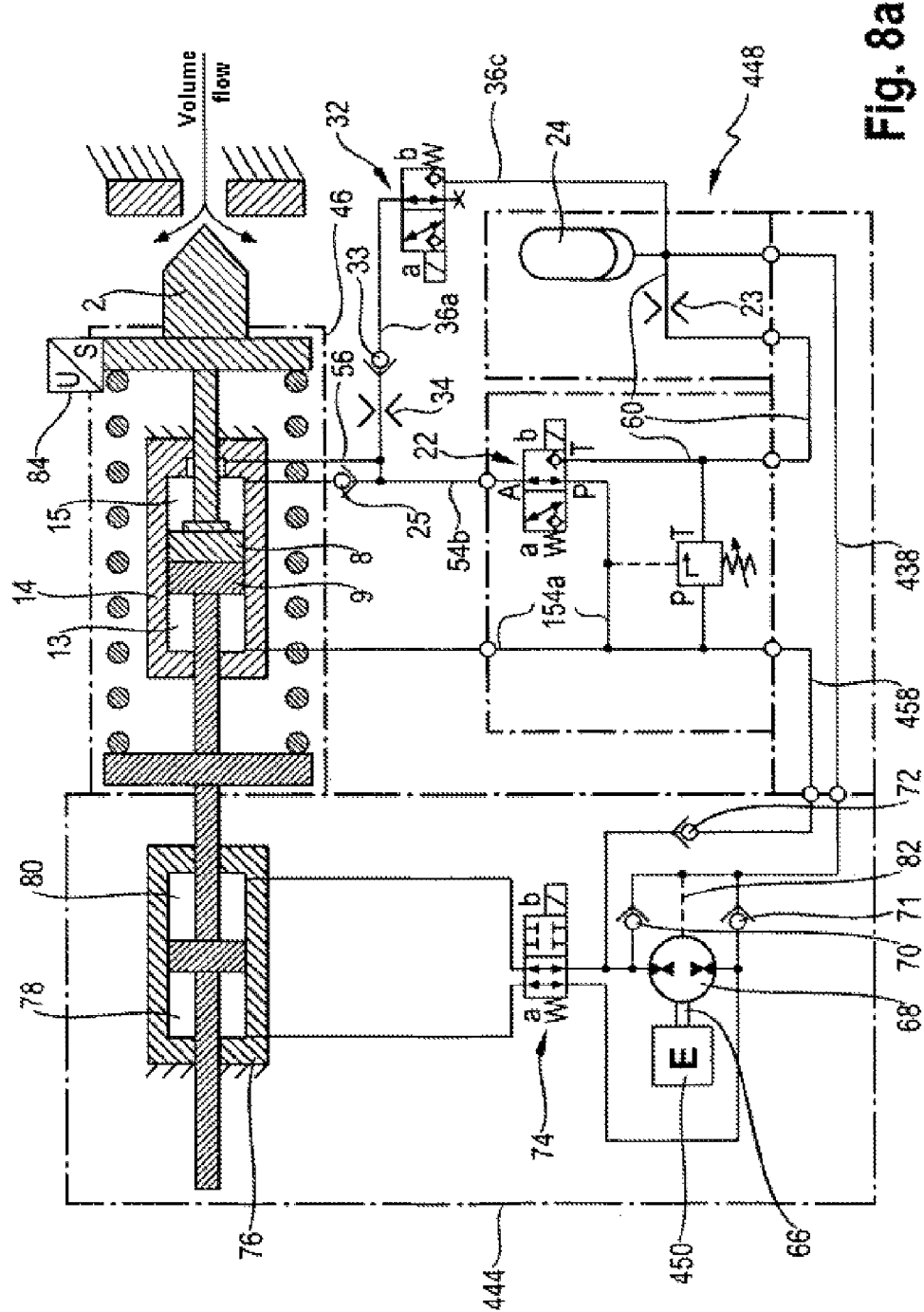
FIGS. 8a to 8d show, in a schematic illustration, a fifth exemplary embodiment of a drive according to the disclosure with an adjustment drive, a hydraulic arrangement and a coupling device with hydraulic locking device.
Figure 8B:
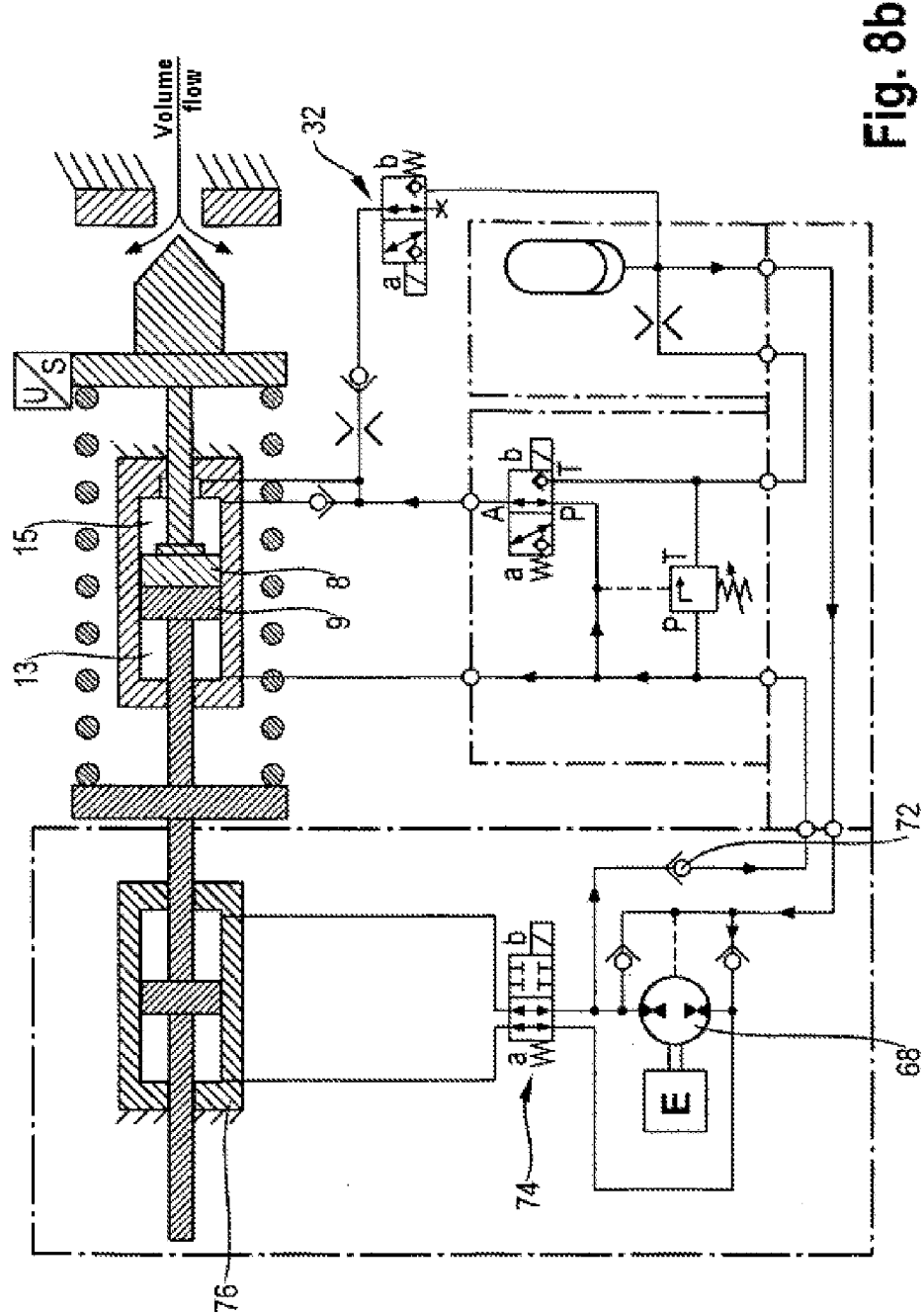
Figure 8C:
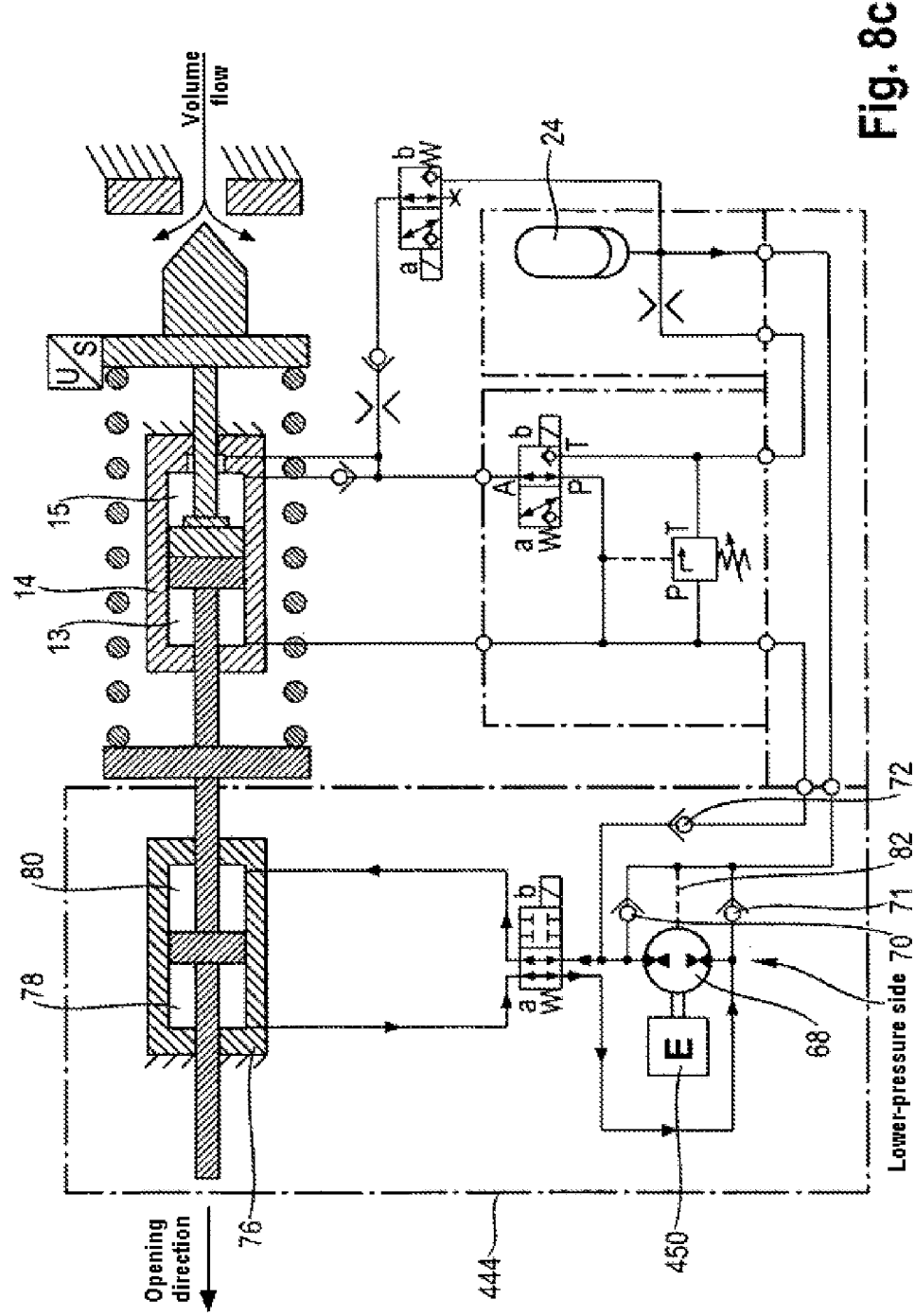
Figure 8D:
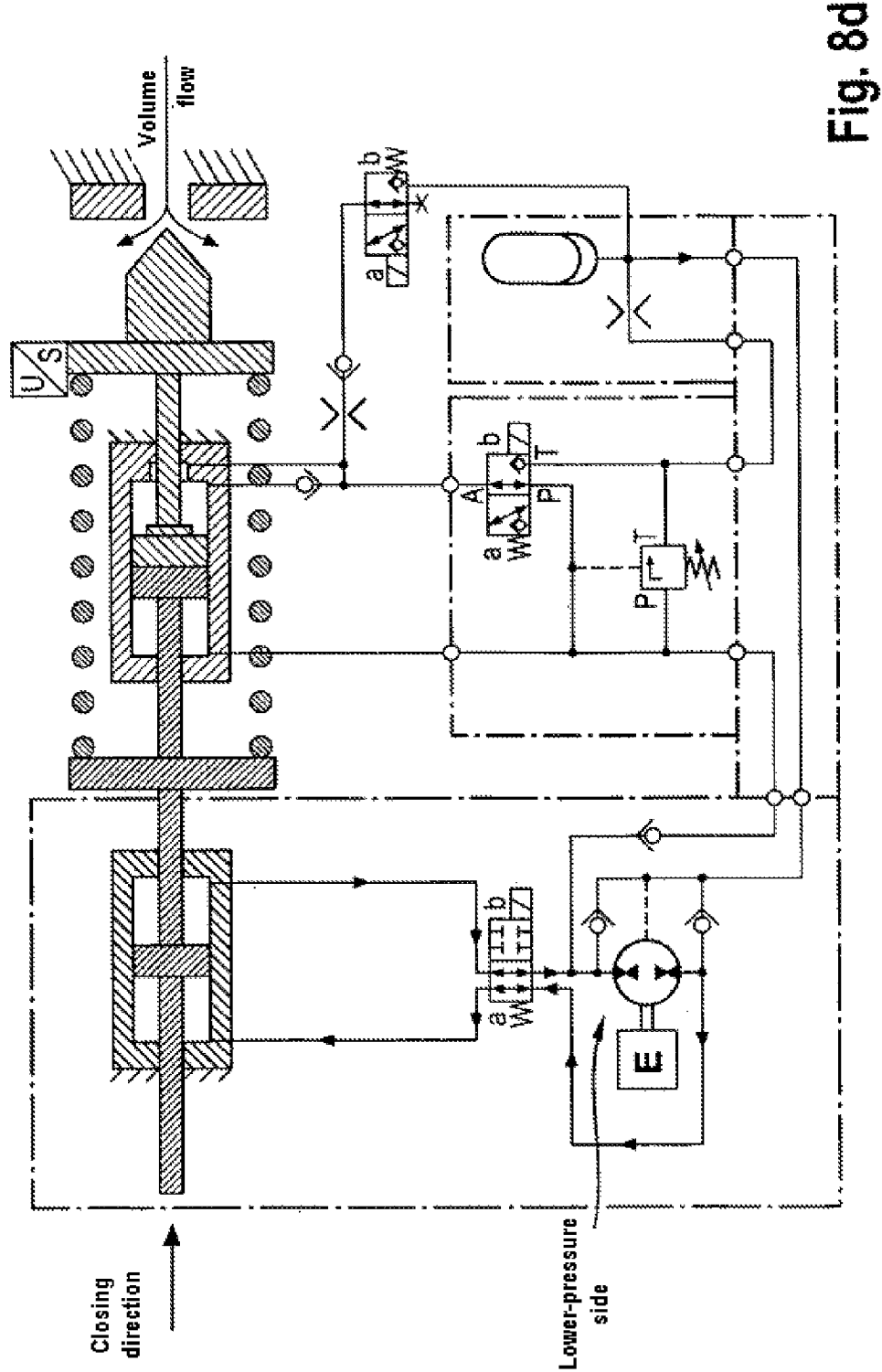

FIG. 8b shows the pump function, and FIGS. 8c and 8d show the opening and closing movement of said drive.

Cavitation on the respective low-pressure side of the machine 68 is prevented by the check valves 70, 71, which connect the low-pressure accumulator 24 to the in each case lower-pressure side. The leakage of the machine 68 is conducted via a leakage line 82 to the low-pressure accumulator 24.

It is a prerequisite for the function that, during operation, the pressure in the annular chambers 13, 15 of the cylinder 14 is always greater than the pressure in the annular chambers 78, 80 of the cylinder 76, because in this way the check valve 72 hydraulically separates the adjustment drive 444 from the annular chambers 13, 15 of the cylinder 14. The separation is eliminated only during the pumping process.

The drive according to the fifth exemplary embodiment reduces the outlay in terms of construction because, aside from various lines, the items 16, 17, 18a, 18b, 19, 20 and 64 of the first exemplary embodiment (cf. FIG. 3) are dispensed with. Furthermore, said drive increases reliability in relation to the adjustment drive 44 in the form of a spindle drive shown in FIGS. 1 and 2, because the twist prevention facility and nut lubrication required therein and the rolling bearing arrangement of the spindle can be dispensed with. Furthermore, through suitable selection of the size of the cylinder surfaces of the cylinder 76, the electric motor 450 and the machine 68 coupled thereto can be ideally adapted to the movement to be performed. It is thus possible to use an electric motor 450 which is reduced in size in relation to the exemplary embodiments described above. A further simplification arises in that the pump function is inherent in the machine 68. The machine 68 which is operated as a pump can, in interaction with the 4/2 directional valve 74 and the check valve 72, increase the pressure in the annular chambers 13, 15 (FIG. 8b). The pump function of the piston 9, the high-pressure accumulator 16 and the driving-side 3/2 directional seat valve 20, which connects said high-pressure accumulator to the annular chamber 13, are thus dispensed with.

During the pumping process, the two pistons 8, 9 remain in contact and do not move. The cylinder 76 is blocked by the 4/2 directional valve 74 which is switched into switching position b. A pressure reduction in the annular chambers 13, 15 by the 3/2 directional seat valve 32, the lines 36a to c, the check valve 33 and the orifice 34 is thus not necessary, such that this procedure can be omitted and the corresponding items can be dispensed with (cf. FIGS. 3 and 4).

The drive according to FIGS. 8a to 8d additionally requires a travel measurement device 84 configured to regulate the position of the valve body 2 with respect to the positionally fixed cylinder 14 via the electric motor 450. The position of the nut of the spindle drive 52 as per the above-described exemplary embodiments is an exact function of the angle of rotation of the electric motor 50. The spindle drive 52 thus does not require a travel measurement device. Said exact proportionality does not apply for the hydraulic direct drive as per the fifth exemplary embodiment owing to the volumetric efficiency of the machine 68 which is operated as a pump.

The device for speed limitation (orifice 23) illustrated in FIGS. 1 to 8 and the hydraulic end position damping 5, 7 may alternatively also be electric, magnetorheological or pneumatic, or take place electrically, magnetorheologically or pneumatically.

A further exemplary embodiment (not shown) of the drive according to the disclosure relates to a butterfly valve. Here, according to the prior art, a drive with emergency function serves, via a rotatable shaft, to pivot in an opening or closing sense a closing plate which is fastened to said shaft. An adjusting drive and an emergency spring act on a thrust rod with a peg. Said peg is received in a slot of a lever to which the shaft is fastened. A longitudinal movement of the thrust rod thus leads, via the peg and the slot, to a pivoting movement of the lever and to a rotational movement of the shaft, as a result of which the closing plate of the butterfly valve which is fastened to said shaft opens or closes. Here, the emergency spring is constantly stressed or relaxed.

The drive according to the disclosure for a butterfly valve is based on the same principle as that described with reference to FIGS. 1 to 4 and 8. However, by contrast to the exemplary embodiments shown, in said drive (not shown) according to the disclosure for a butterfly valve, the force of the adjustment drive is introduced into the driving-side piston not at one side via the driving-side spring abutment but rather to the opposite side of said driving-side piston via a relatively long rod through the pivot drive. Here, the long rod extends through the thrust rod of the pivot drive, the driven-side piston rod, the driven-side piston, the driven-side spring abutment and a part of the emergency spring.

Disclosed is a drive with emergency closing function, having a movable coupling device which has an emergency spring braced between a driving-side spring abutment and a driven-side spring abutment. The emergency spring is preferably a compression spring which is moved jointly with the coupling device. A spacing of the spring abutments in a normal operating mode of the drive is fixed by a locking device, wherein, after a release or unlocking of the locking device, the emergency spring is configured to relax for an emergency function or emergency movement of the drive. Here, according to the disclosure, the locking device is hydraulically or pneumatically and/or magnetically actuated, or can be hydraulically or pneumatically and/or magnetically triggered.

LIST OF REFERENCE NUMERALS

1 Valve seat
2 Valve body
3 Driven-side spring abutment
4 Driven-side piston rod
5 Damping chamber
6 Emergency spring
7 Damping peg
8 Driven-side piston
9 Driving-side piston
10 Driving-side piston rod
11 Aeration duct
12 Driving-side spring abutment
13 Driving-side annular chamber
14 Cylinder
15 Driven-side annular chamber
16 High-pressure accumulator
17 Check valve
18a, 18b Orifice
19, 21 Pressure-limiting valve
20 Driving-side 3/2 directional seat valve
22 Driven-side 3/2 directional seat valve
23 Orifice
24 Low-pressure accumulator/tank
25 Check valve
26, 28 Spacer part
27 Coil
32 3/2 directional seat valve
33 Check valve 34 Orifice
36a, 36b, 36c Line
38; 138 Suction line
40 Relief line
42 Relief line
44; 444 Adjustment drive
46; 146; 346 Coupling device
48; 148; 448 Hydraulic arrangement
50; 450 Electric motor
52 Spindle drive
54a; 154a Driving-side portion
54b Driven-side portion
54c Central portion
56 Bypass line
58a, 58b; 458 High-pressure line
60 Low-pressure line
62 Bypass line
64; 164 Check valve
66 Coupling
68 Machine
70, 71, 72 Check valve
74 4/2 directional valve
76 Cylinder
78, 80 Annular chamber
82 Leakage line
84 Travel measurement device

The invention claimed is:

1. A hydraulic drive comprising:
a movable coupling device comprising an emergency spring braced between a movable driving-side spring abutment and a movable driven-side spring abutment; and
a locking device configured to fix a spacing of the driving-side spring abutment and the driven-side spring abutment in a normal operating mode of the drive, the locking device being at least one of hydraulic, pneumatic, and magnetic,
a valve having a valve body operably connected to the driven-side spring abutment;
an adjustment drive configured to generate a translatory driving-side movement which is transmitted via the coupling device into a translatory driven-side movement of the valve body;
a cylinder that is positionally fixed in the hydraulic drive and defines a driven-side annular chamber; and
a driven-side piston positioned in the driven-side annular chamber and fixedly connected via a driven-side piston rod to the driven-side spring abutment,
wherein the locking device and the emergency spring are configured such that, when the hydraulic drive is in an emergency mode, the locking device is released and the emergency spring is relaxed, and
wherein, when the locking device is released, the emergency spring biases the valve body in a closing direction so as to close the valve.

2. The hydraulic drive of claim 1, the driven-side piston further comprising a damper configured to move in the closing direction at an end of the closing of the valve when the drive is in the emergency mode.

3. The hydraulic drive of claim 2, wherein the damper is a fluidic end position damper.

4. The hydraulic drive of claim 1, wherein:
the cylinder defines a driving-side annular chamber,
the coupling device further comprises a driving-side piston fixedly connected via a driving-side piston rod to the driving-side spring abutment, and
the driving-side piston rod extends through the driving-side annular chamber.

5. The hydraulic drive of claim 4, wherein the adjustment drive and the driving-side piston are coupled by a connecting rod which extends through the driven-side spring abutment, the driven-side piston rod and the driven-side piston.

6. The hydraulic drive of claim 4, wherein the driving-side piston and the driven-side piston are arranged between the driving-side annular chamber and the driven-side annular chamber, and wherein the driving-side and driven-side annular chambers are configured to be hydraulically coupled via a coupling line.

7. The hydraulic drive of claim 6, wherein one of the coupling line and the driven-side annular chamber is configured to be connected via a low-pressure line to a low-pressure accumulator.

8. The hydraulic drive of claim 7, wherein the locking device further comprising comprises:
a driven-side 3/2 directional seat valve in one of the low-pressure line and the coupling line; and
an orifice arranged in the one of the low-pressure line and the coupling line directly upstream of the driven-side 3/2 directional seat valve.

9. The hydraulic drive of claim 7, the locking device further comprising a driven-side 3/2 directional seat valve configured to control flow through the coupling line and connected to the low-pressure line,
wherein said driven-side 3/2 directional seat valve and said driven-side annular chamber are configured such that the driven-side annular chamber is connected to the low-pressure accumulator when the drive is in the normal operating mode.

10. The hydraulic drive of claim 9, the locking device further comprising:
a damping chamber connected via a bypass line to a first portion of the coupling line which connects the driven-side 3/2 directional seat valve and the driven-side annular chamber; and
a coupling line check valve arranged in a second portion of the coupling line which connects the driven-side annular chamber to a connection of with the bypass line, the coupling line check valve configured to open from the driven-side 3/2 directional seat valve toward the driven-side annular chamber.

11. The hydraulic drive of claim 10, wherein:
a third portion of the coupling line arranged between the coupling line check valve and the driven-side 3/2 directional seat valve is configured to be connected via a coupling line 3/2 directional seat valve to the low-pressure line or to a high-pressure line; and
an orifice and a first check valve which is configured to open toward the coupling line 3/2 directional seat valve are arranged in a line which is configured to connect the third portion of the coupling line to the coupling line 3/2 directional seat valve.

12. The hydraulic drive of claim 7, wherein:
the adjustment drive is hydraulic or pneumatic and has a drive cylinder with a drive piston rod configured to be moved by a machine; and
the driving-side spring abutment is fastened to the drive piston rod.

13. The hydraulic drive of claim 7, wherein the low-pressure line and the coupling line are connected via a suction line in which there is arranged a check valve configured to open from the low-pressure line toward the coupling line.

14. The hydraulic drive of claim 7, wherein in the coupling line there is arranged a driving-side 3/2 directional seat valve configured to connect the driving-side annular chamber to a high-pressure accumulator via a high pressure line.

15. The hydraulic drive of claim 14, wherein the low-pressure line and the high-pressure line are connected via a suction line in which there is arranged a suction-line check valve which is configured to open from the low-pressure line toward the high-pressure line.

16. The hydraulic drive of claim 15, the locking device further comprising:
at least one orifice arranged in the high-pressure line between the high-pressure accumulator and a connection with the suction line; and
a high-pressure line check valve configured to open toward the high-pressure accumulator arranged in a bypass line parallel to said at least one orifice.

17. The hydraulic drive of claim 4, wherein an aeration duct is defined extending through one of (i) the driven-side piston and drive-side piston rod and (ii) the driven-side piston and driving-side piston rod.

18. The hydraulic drive of claim 4, wherein, in the normal mode of operation, a pressing force urging the driven-side piston and the driving-side piston together is greater than a sum of a force of the emergency spring and a force sufficient to move the valve body.

19. The hydraulic drive of claim 4, wherein a damping element is arranged between the driving-side piston and the driven-side piston.

20. The hydraulic drive of claim 1, wherein the locking device includes an electromagnet with a coil and with an armature, the coil connected to one of the driven-side spring abutment and the driving-side spring abutment, and the armature connected to the other of the driving-side spring abutment and the driven-side spring abutment.

21. The hydraulic drive of claim 20, wherein:
the coil and the armature are arranged annularly;
the coil is fastened via a first spacer part to the one of the driven-side spring abutment and the driving-side spring abutment;
the armature is fastened via a second spacer part to the other of the driven-side spring abutment and the driving-side spring abutment; and
the emergency spring is arranged in an interior defined by the first and second spacer parts.

22. The hydraulic drive of claim 20, wherein the locking device has a permanent magnet.

23. The hydraulic drive of claim 1, wherein the adjustment drive is connected to the driving-side spring abutment, and/or wherein the adjustment drive is electric, hydraulic or pneumatic.

24. A drive having a movable coupling device comprising:
an emergency spring braced between a driving-side spring abutment and a driven-side spring abutment;
a locking device configured to fix a spacing of the driving-side spring abutment and the driven-side spring abutment in a normal operating mode of the drive, the locking device being at least one of hydraulic, pneumatic, and magnetic, wherein, the locking device and the emergency spring are configured such that, when the drive is in an emergency mode, the locking device is released and the emergency spring is relaxed
a valve having a valve body;
an adjustment drive configured to generate a translatory driving-side movement which is transmitted via the coupling device into a translatory driven-side movement of the valve body, and wherein, the emergency spring is configured to generate a driven-side movement of the valve body in a closing direction of the valve after the locking device is released; and
a positionally fixed cylinder which has a driven-side annular chamber and a driven-side piston, the driven-side piston connected via a driven-side piston rod to the driven-side spring abutment, wherein:
the cylinder has a driving-side piston which is connected via a driving-side piston rod to the driving-side spring abutment, wherein the driving-side piston rod extends through a driving-side annular chamber;
the driving-side piston and the driven-side piston are arranged between the driving-side annular chamber and the driven-side annular chamber, and the annular chambers are configured to be hydraulically coupled via a coupling line;
one of the coupling line and the driven-side annular chamber is configured to be connected via a low-pressure line to a low-pressure accumulator;
the adjustment drive is hydraulic or pneumatic and has a drive cylinder with a drive piston rod configured to be moved by a machine;
the driving-side spring abutment is fastened to the drive piston rod;
a pressure medium connection from the machine to the cylinder is configured to shut off; and
the machine is connected via a high-pressure line to the coupling line and via a suction line to the low-pressure accumulator.

25. The drive of claim 24, wherein the suction line is connected via two branch lines to two working connections of the machine, wherein one check valve is arranged in each of the two branch lines.

26. A hydraulic drive comprising:
a movable coupling device comprising an emergency spring braced between a movable driving-side spring abutment and a movable driven-side spring abutment; and
a locking device configured to fix a spacing of the driving-side spring abutment and the driven-side spring abutment in a normal operating mode of the drive, the locking device being at least one of hydraulic, pneumatic, and magnetic; and
a support or fastening element configured as a hydraulic block having one or more pressure accumulators, valves, lines and ducts arranged therein or thereon,
wherein the locking device and the emergency spring are configured such that, when the hydraulic drive is in an emergency mode, the locking device is released and the emergency spring is relaxed.

* * * * *

UNITED STATES PATENT AND TRADEMARK OFFICE
CERTIFICATE OF CORRECTION

PATENT NO.           : 9,528,627 B2
APPLICATION NO.      : 13/634747
DATED                : December 27, 2016
INVENTOR(S)          : Udo Froehlich et al.

It is certified that error appears in the above-identified patent and that said Letters Patent is hereby corrected as shown below:

On the Title Page

In Item (75), Inventors should read:
Inventors: Udo Froehlich, Rothenfels (DE);
       Richard Tauber, Heigenbruecken (DE);
       Ibrahim Doertoluk, Haibach (DE);

In the Claims

In Column 14, Lines 40-42, Lines 7-9 of Claim 10 should read:
a coupling line check valve arranged in a second portion
    of the coupling line which connects the driven-side
    annular chamber to a connection with the bypass In Column 15, Lines 19-22, Claim 17 should read:
    17. The hydraulic drive of claim 4, wherein an aeration
duct is defined extending through one of (i) the driven-side
piston and driven-side piston rod and (ii) the driving-side
piston and driving-side piston rod.

In Column 16, Lines 1-4, Lines 9-12 of Claim 24 should be corrected as follows:
matic, and magnetic, wherein, the locking device and
the emergency spring are configured such that, when
the drive is in an emergency mode, the locking device
is released and the emergency spring is relaxed;

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*